(12) United States Patent
Hauenschild et al.

(10) Patent No.: US 9,246,616 B2
(45) Date of Patent: Jan. 26, 2016

(54) CLOCK PHASE COMPENSATOR FOR MULTI-STAGE TIME DIVISION MULTIPLEXER

(71) Applicant: Cisco Technology, Inc., San Jose, CA (US)

(72) Inventors: Juergen Hauenschild, Bochum (DE); Markus Kukiela, Nürnberg (DE)

(73) Assignee: Cisco Technologies, Inc., San Jose, CA (US)

( * ) Notice: Subject to any disclaimer, the term of this patent is extended or adjusted under 35 U.S.C. 154(b) by 169 days.

(21) Appl. No.: 14/174,087

(22) Filed: Feb. 6, 2014

(65) Prior Publication Data
US 2015/0222379 A1    Aug. 6, 2015

(51) Int. Cl.
H04J 3/06    (2006.01)
H04L 7/00    (2006.01)
H04J 3/04    (2006.01)

(52) U.S. Cl.
CPC .............. *H04J 3/0685* (2013.01); *H04J 3/047* (2013.01); *H04L 7/0037* (2013.01)

(58) Field of Classification Search
CPC ...... H04J 3/0685; H04J 3/047; H04L 7/0037; H04L 25/14
USPC ......... 370/310, 345, 350, 464, 498, 503, 509, 370/510, 512, 507, 508, 516, 518
See application file for complete search history.

(56) References Cited

U.S. PATENT DOCUMENTS

| | | | |
|---|---|---|---|
| 6,636,532 B1 * | 10/2003 | Dorschky | 370/537 |
| 6,901,126 B1 | 5/2005 | Gu | |
| 2002/0054409 A1 | 5/2002 | Bartur et al. | |
| 2003/0063626 A1 * | 4/2003 | Karlquist | 370/503 |
| 2007/0064781 A1 * | 3/2007 | Yamaguchi et al. | 375/221 |
| 2012/0076231 A1 * | 3/2012 | Mateman et al. | 375/295 |

\* cited by examiner

*Primary Examiner* — Obaidul Huq
(74) *Attorney, Agent, or Firm* — Edell, Shapiro & Finnan, LLC

(57) ABSTRACT

An upstream multiplexer multiplexes data into first and second serialized data streams based on first and second low frequency clocks each derived from a high frequency clock. A downstream multiplexer multiplexes the first and second serialized data streams into a third serialized data stream based on the high frequency clock. A timing error detector derives an error signal indicative of a phase-misalignment between the high frequency clock and the first and second serialized data bit streams based on the high frequency clock and the first and second low frequency clocks. A phase adjuster adjusts phases of the first and second low frequency clocks relative to the high frequency clock based on the error signal so as to reduce the phase-misalignment.

20 Claims, 12 Drawing Sheets

CLOCK PHASE COMPENSATOR FOR MULTI-STAGE TIME DIVISION MULTIPLEXER

TECHNICAL FIELD

The present disclosure relates generally to clock phase compensation for multi-stage time division multiplexers used as data serializers.

BACKGROUND

A time division multiplexer converts input data bits into a serialized data output. The multiplexer receives a clock signal at a selector input of the multiplexer that causes the multiplexer to alternately select among the data bits and successively output the selected bits in the serialized data. Circuit delays introduced by the multiplexer and associated clock circuits can cause an undesired phase-misalignment between the clock and the input data that is selected by the clock. The phase-misalignment can cause indeterminate data selection in the multiplexer, which results in bit errors in the serialized data. The phase-misalignment is especially problematic in a multiplexer that operates in the gigabit frequency range.

DESCRIPTION OF EXAMPLE EMBODIMENTS

Overview

Embodiments presented herein compensate for a phase-misalignment between a selector clock and parallel input data streams that are selected by the clock in a time division multiplexer used to serialize the data streams. A first multiplexer multiplexes data bits into first and second serialized data bit streams based on phase-offset first and second low frequency clocks each derived from a high frequency clock. A second multiplexer configured to multiplex the first and second serialized data bit streams into a third serialized data bit stream based on the high frequency clock. A timing error detector derives an error signal indicative of a phase-misalignment between the high frequency clock and the first and second serialized data bit streams based on the high frequency clock and the first and second low frequency clocks. A phase adjuster adjusts phases of the first and second low frequency clocks relative to the high frequency clock based on the error signal so as to reduce the phase-misalignment.

Example Embodiments

Figure 1:
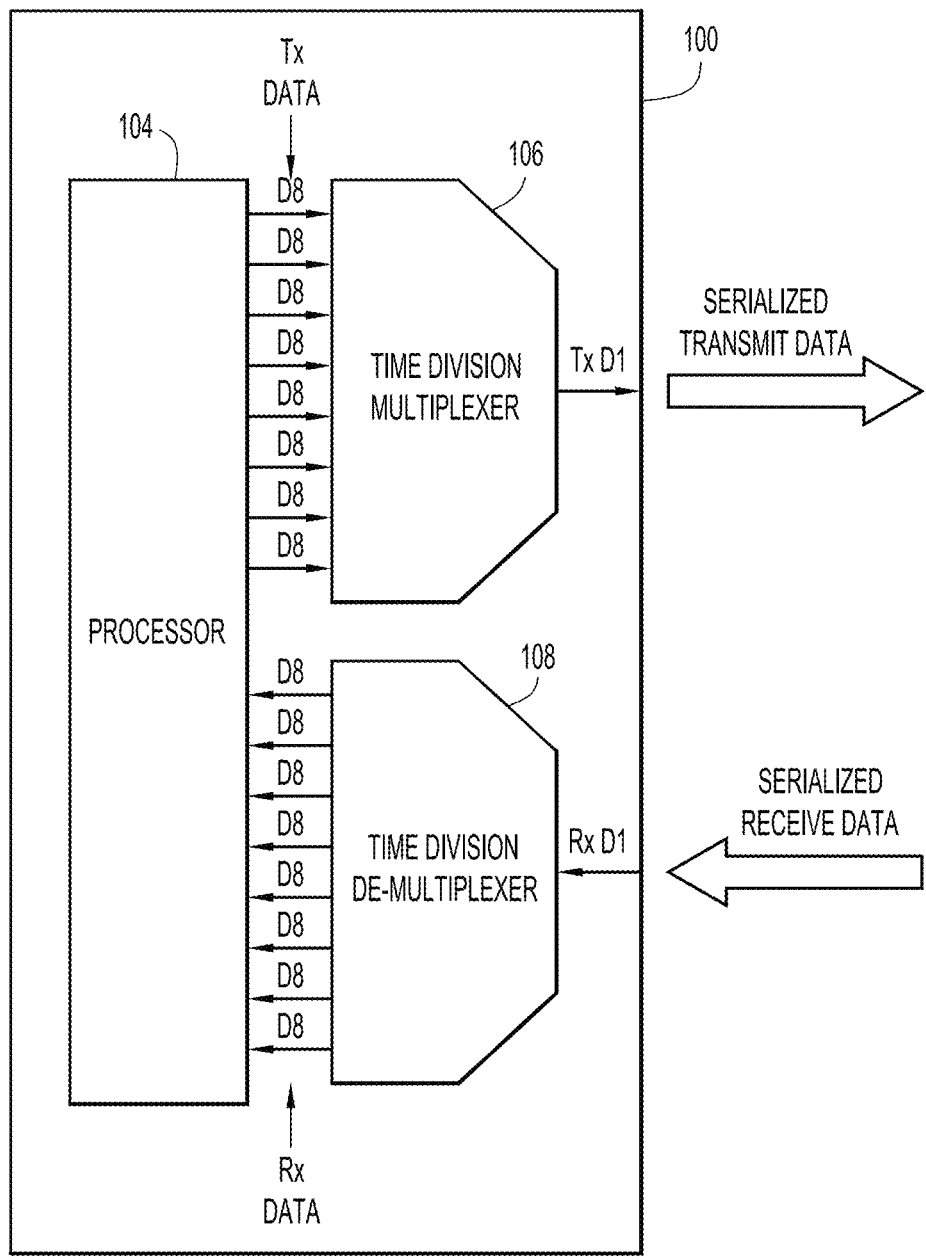
FIG. 1 is a block diagram of an example integrated circuit (IC) chip on which time division multiplexer (TDM) techniques described herein may be implemented.

Referring first to FIG. 1, there is shown a block diagram of an example integrated circuit (IC) chip 100 on which time division multiplexer techniques described herein may be implemented. IC chip 100 may be included in a computer device, for example. IC chip 100 includes a digital processor 104, a time division multiplexer 106, and a time division de-multiplexer 108 each constructed on the IC chip. Together, time division multiplexer 106 and time division de-multiplexer 108 form a Serializer-Deserializer (SerDes) interface for IC chip 100 through which serialized data may be transmitted at multi-gigabit data rates either wirelessly or through a wired communication link between processor 104 and an off-chip device.

In a transmit (TX) direction, processor 104 generates parallel data TX D8<0:7> (collectively referred to as parallel data TX D8) and provides the parallel data to corresponding parallel data inputs of time division multiplexer 106. Time division multiplexer 106 time division multiplexes (i.e., serializes) parallel data TX D8 into serialized data TX D1 (also referred to as a serialized data bit stream TX D1). In a receive (RX) direction, time division de-multiplexer 108 receives serialized data RX D1 (also referred to as serialized data bit stream RX D1). Time division de-multiplexer 108 time division de-multiplexes (i.e., de-serializes) serialized data RX D1 into parallel data RX D8<0:7> (collectively referred to as parallel data RX D8) and provides the parallel data to processor 104.

Figure 2:
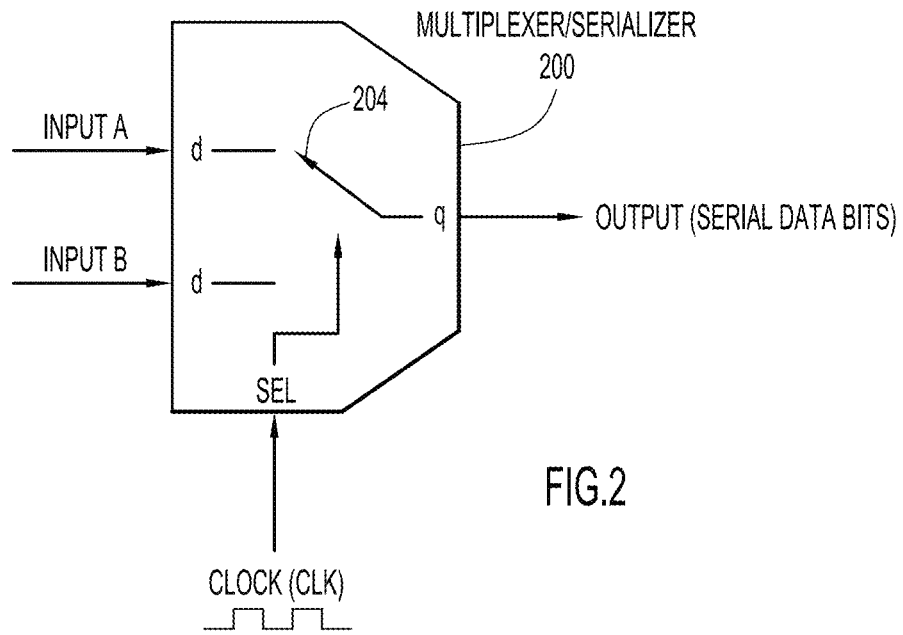
FIG. 2 is a conceptual illustration of a time division multiplexer used as a data serializer.

By way of background, reference is now made to FIG. 2, which is a conceptual illustration of a simple time division multiplexer 200 used as a data serializer. Multiplexer 200 receives input data bits "Input A" and "Input B" at respective parallel data inputs d of the multiplexer, and time division multiplexes the input data bits into a serialized data bit stream "Output" at an output q of the multiplexer. More specifically, multiplexer 200 includes a selector 204 that selects either Input A or Input B based on a level of a selector clock signal "clock" applied to a selector input sel of the selector, and routes the selected input (either Input A or Input B) to output q as serialized data bit Output.

Figure 3:
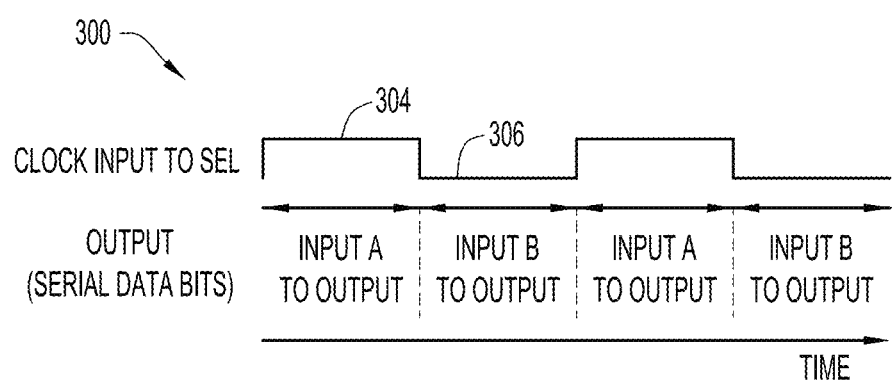
FIG. 3 is a timing diagram that shows a timing relationship between a clock applied to a selector input of the time division multiplexer of FIG. 2 and data inputs to, and data outputs from, the multiplexer.

With reference to FIG. 3, there is shown an illustration of a timing relationship 300 between clock selector "clock" and the inputs Input A and Input B that are selected/outputted in Output based on the selector clock. During a positive half-cycle (or half-wave) 304 of the selector clock, selector 204 selects/outputs Input A. During a negative half-cycle 306 of the selector clock immediately following positive clock half-cycle 304, selector 204 selects/outputs Input B. The aforementioned sequence of selection/output operations repeats for next positive and negative half-cycles of the clock selector, as depicted in FIG. 3. Thus, multiplexer 200 alternately selects Input A and Input B based on successive half-cycles (e.g., half-cycles 304, 306) of the clock and outputs the alternately selected inputs as successive data bits in serialized data Output.

The following nomenclature is used in the ensuing description of time division multiplexers:

Clock signals (also referred to as "clocks") are named starting with "C," e.g., "clock C1."

Data signals (also referred to as "data bits" and "data") are named starting with "D," e.g., "data D1."

A relative frequency/bitrate associated with a clock/data signal is denoted with a number after the letter "C"/"D," as follows:

Frequency $C1=2 \times C2=4 \times C4$; and
Data bitrate $D1=2 \times D2=4 \times D4$.

In time division multiplexer examples described below in connection with FIGS. 4 and 7, clocks/data have the following example frequencies/bitrates:

C1=10 GHz, C2=5 GHz, C4=2.5 GHz; and
D1=20 Gbps, D2=10 Gbps, D4=5 Gbps.

A quadrature (90°) phase offset between 2 clocks with the same frequency is determined with the appendix "sin" and "cos."

A "time division multiplexer" is also referred to simply as a "multiplexer."

"Time division multiplex" and variants thereof are referred to as "serialize" and variants thereof.

The terms "serial" and "serialized" are synonymous and used interchangeably.

The term "serialized data" is also referred to as a "serialized data bit stream" and a "serialized data stream."

The term "parallel data" is also referred to as "parallel data bits."

A "circuit delay" is a time delay introduced by a circuit; thus, the terms "circuit delay" and "time delay" are used herein interchangeably.

A "replica" circuit is a substantially identical copy of an original circuit. The replica circuit (also referred to simply as the "replica") performs the same function as the original circuit, has the same schematic layout as the original circuit, and includes the same fan-in and fan-out as the original circuit. This identity ensures that the replica and original circuit have the same circuit characteristics, including circuit delays. If the replica and original circuit are fabricated on the same IC chip, the characteristics of each circuit track one another over process, voltage, and temperature variations.

Figure 4:
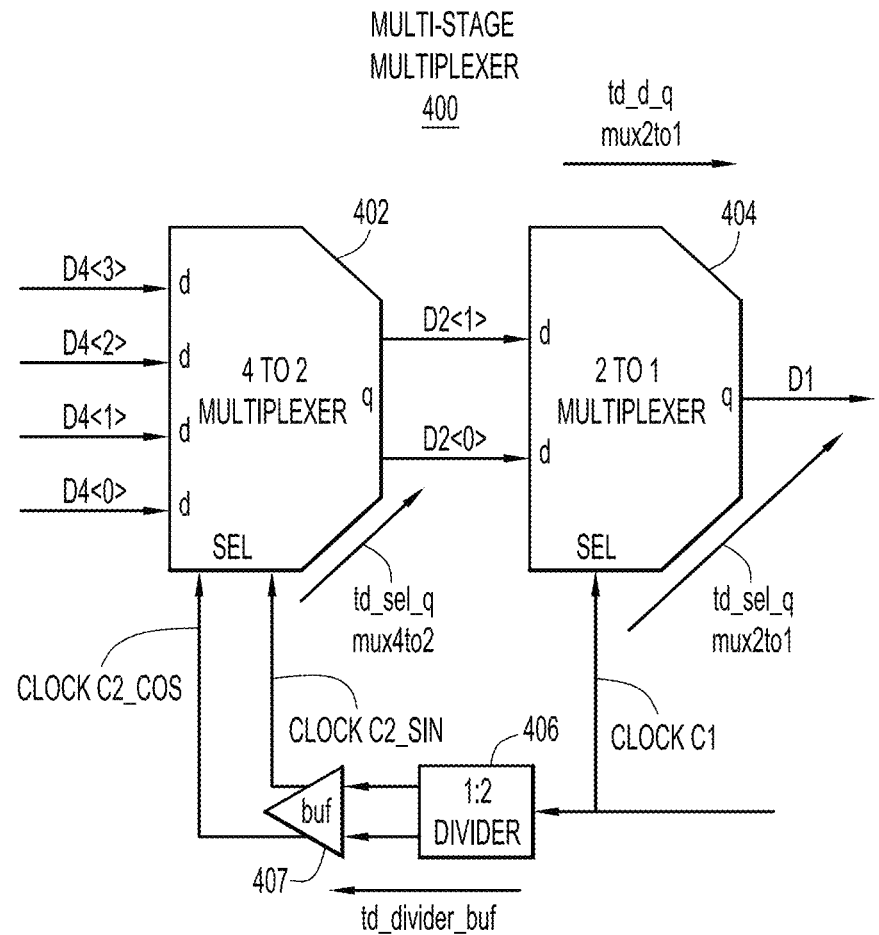
FIG. 4 is a block diagram of an example multi-stage time division multiplexer configured to serialize data and that does not include a clock phase compensator to compensate for an undesired phase-misalignment between a clock and input data that is selected by the clock.

With reference to FIG. 4, there is depicted a block diagram of a multi-stage time division multiplexer 400 to serialize data according to a first embodiment that does not include, i.e., without, clock time/phase compensation. Multi-stage multiplexer 400 may be implemented in an output stage of multiplexer 106 of FIG. 1 that produces serialized data D1 (note that in this and the following description, the serialized data "TX D1" is referred to simply as serialized data "D1"). Multi-stage multiplexer 400 includes a 4:2 upstream (or first stage) multiplexer 402, a 2:1 downstream (or second stage) multiplexer 404, and a clock-divider-and-buffer 406. Multi-stage multiplexer 400 processes, i.e., serializes, data D4 presented to parallel data inputs of the multiplexer into serialized data D1 in a "downstream" or left-to-right direction in FIG. 3.

Clock divider 406 (and associated buffer 407) frequency divides a relatively high frequency downstream clock C1 (having a frequency C1) by a factor of two to produce two phase-offset, relatively low frequency upstream clocks C2_cos and C2_sin each having a frequency C2 that is half of frequency C1. Clocks C2_cos and C2_sin are in quadrature with each other, i.e., clock C2_cos leads clock C2_sin by a phase-offset of 90°. Clock divider 406 and buffer 407 provide clocks C2_cos and C2_sin to respective selector inputs of multiplexer 402.

An 8:4 multiplexer (not shown in FIG. 4) positioned upstream from multiplexer 402 (i.e., positioned between processor 104 of FIG. 1 and multiplexer 402) may multiplex parallel data RX D8 from processor 104 into data D4<0:3>, and provide the data D4 to multiplexer 402. Thus, data D4<0:3> represents four bit streams (D4<0>, D4<1>, D4<2>, and D4<3>) that are presented to parallel data inputs of multiplexer 402. Upstream multiplexer 402 multiplexes data D4<0:3> into phase-offset first and second serialized data bit streams D2<0:1> based on phase-offset clocks C2_cos and C2_sin.

Downstream multiplexer 404 multiplexes data D2<0:1> from upstream multiplexer 402 into serialized data D1 based on clock C1, which is applied to a selector input of the downstream multiplexer.

Figure 5:
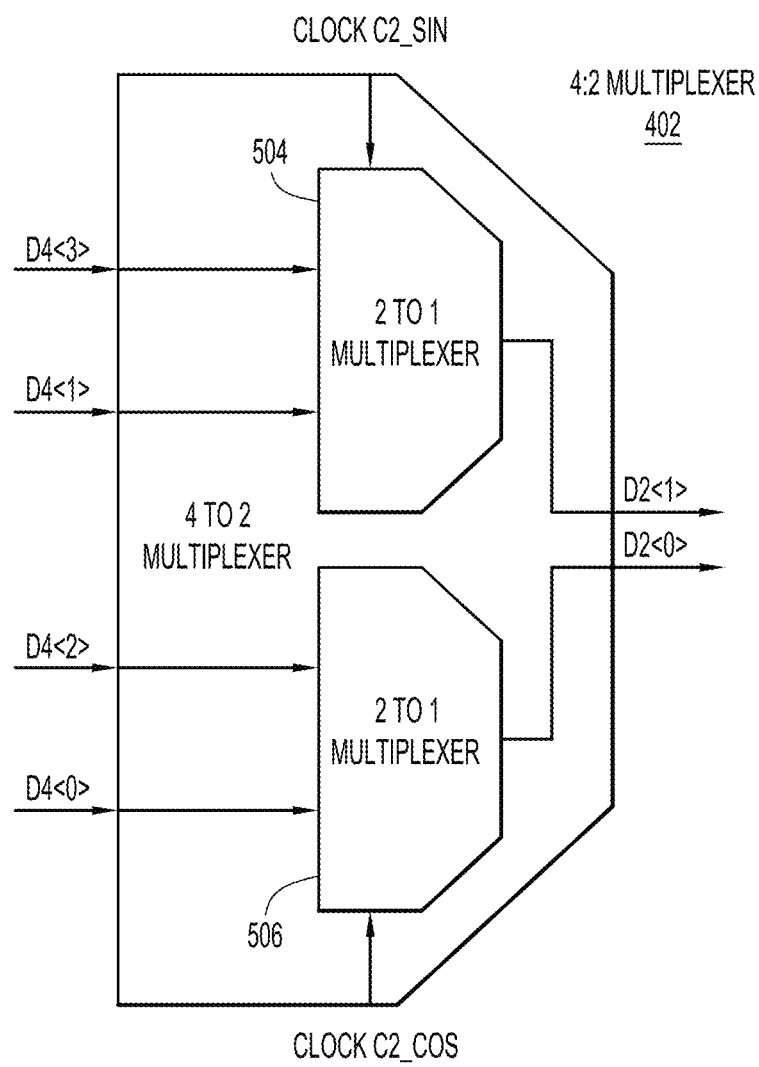
FIG. 5 is a detailed block diagram of an upstream multiplexer used in the multi-stage time division multiplexer of FIG. 4.

With reference to FIG. 5, a detailed block diagram of upstream multiplexer 402 is depicted. Upstream multiplexer 402 includes a first upstream 2:1 multiplexer 504 and a second upstream 2:1 multiplexer 506 that multiplex, i.e., serialize, data in parallel with each other. Specifically, multiplexer 504 multiplexes data D4<3> and D4<1> into serialized data D2<0> based on clock C2_sin, and multiplexer 506 multiplexes data D4<2> and D4<0> into serialized data D2<0> based on clock C2_cos.

Returning to FIG. 4, multi-stage multiplexer 400 introduces a variety of timing or phase errors that accumulate into a deleterious phase-misalignment between clock C1 and the data bits of data D2<1> and D2<0>. The phase-misalignment causes data bit errors in serialized data D1 such that the data bits in the serialized data do not accurately represent the data bits of data D2<1> and D2<0>. The timing errors result from circuit delays, e.g., logic gate delays, introduced by multiplexers 402 and 404 and clock divider 406 and buffer 407. The various circuits of multi-stage multiplexer 400 introduce the following circuit delays that contribute to the phase-misalignment:

i. clock divider 406 and buffer 407 introduce a circuit delay td_divider_buf between clock C1 and clocks C2_cos and C2_sin;

ii. multiplexer 402 introduces a selector-path circuit delay td_sel_q (mux4to2) between the times when clocks C2_cos and C2_sin are asserted and corresponding selected input bits of data D4<0:3> appear as output bits of data D2<0:2> (i.e., appear at q outputs of the upstream multiplexer). Each of upstream multiplexers 504 and 506 introduce this delay; and iii. Multiplexer 404 introduces (i) a selector-path circuit delay td_sel_q (mux2to1) between a time when clock C1 is asserted and a corresponding selected one of data bits D2<0:1> is presented as a data output bit D1 at output q, and (ii) a data-path circuit delay td_d_q (mux2to1) corresponding to a time for selected ones of input data bits D2<0:1> to propagate through the multiplexer. Circuit delay td_d_q is a data through-put delay of multiplexer 404.

The fact that circuit delay td_divider_buf introduces circuit delay in the upstream direction while circuit delay td_d_q and circuit delays td_sel_q (mux4to2) and (mux2to1) introduce different circuit delays in the downstream direction exacerbates the phase-misalignment between data D2 and clock C1 in downstream multiplexer 404.

Figure 6:
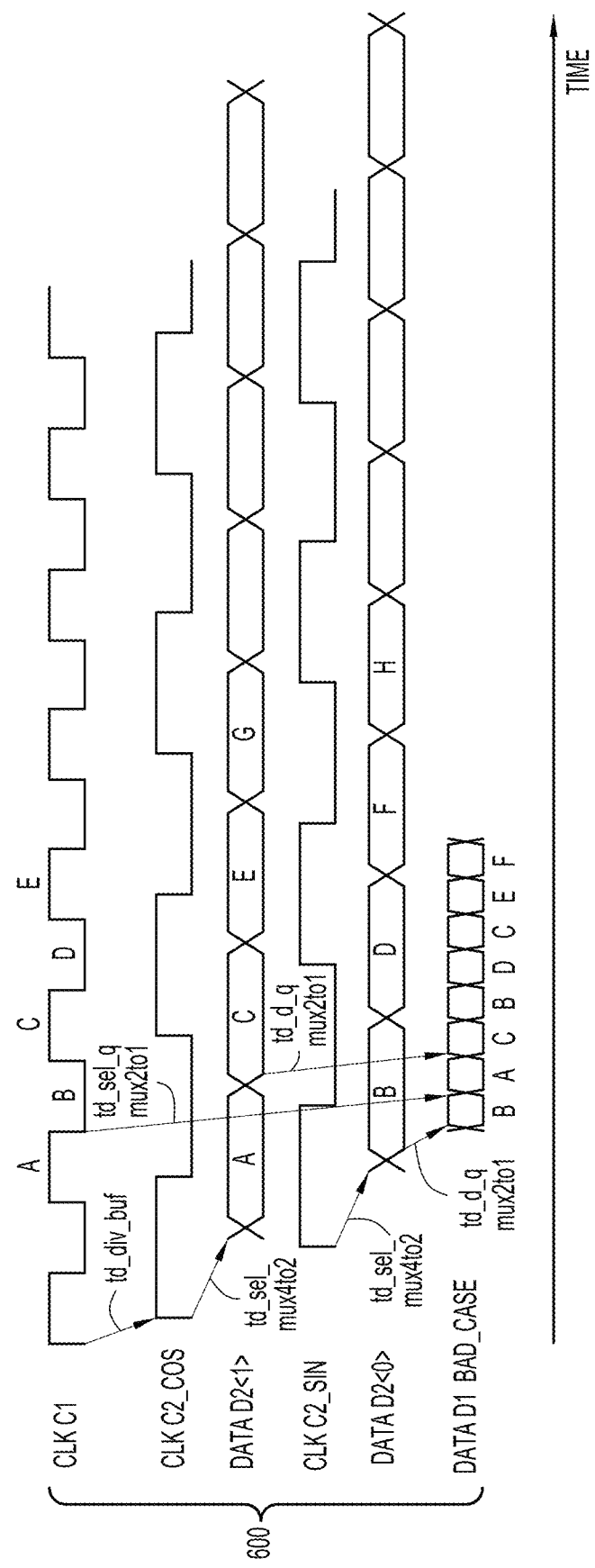
FIG. 6 is a timing diagram that shows an example timing relationship between various clock and data signals used in the multi-stage time division multiplexer of FIG. 4 and in which there is depicted an undesired phase-misalignment between a high frequency clock and input data (that is to be selected by the high frequency clock) in a downstream multiplexer of the multi-stage time division multiplexer.

FIG. 6 is a timing diagram that shows a non-ideal timing relationship 600 between various clock and data signals in multi-stage multiplexer 400 in which an undesired phase-misalignment between clock C1 and data D2<0:1> results from the above-mentioned circuit delays that are depicted in FIG. 6. To better understand the non-ideal timing arrangement depicted in FIG. 6, first an ideal timing arrangement that exists without the phase-misalignment is briefly described. In the ideal timing arrangement, successive half-cycles of clock C1 cause multiplexer 404 to alternately select data bits from data D2<1> and D2<0> and successively output the alternately selected data bits in serialized data D1. In the ideal timing arrangement, each half-cycle of clock C1 is time/phase-aligned with, e.g., centered within, a data eye of a corresponding data bit to be selected for output. This avoids a situation in which a given half-cycle overlaps with, and erroneously selects, a data transition between one data bit and the next. An example of the ideal timing relationship will be described below in connection with FIG. 8.

With reference to FIG. 6, if clock C2 and data D2<0> and D2<1> were properly aligned according to the ideal timing arrangement (which they are not in the example of FIG. 6), clock half-cycles A, B, C, and D of clock C1 would alternately select corresponding data bits A, B, C, and D from data D2<0> and D2<1> and cause downstream multiplexer 404 to correctly output the selected bits as successive data bits A, B, C, and D in serialized data D1. However, the circuit delays mentioned above in connection with FIG. 4 and indicated in FIG. 6 contribute to the undesired phase-misalignment between the half-cycles of clock C1 and data D2<1> and D2<0>, as depicted in FIG. 6. The phase-misalignment causes the half-cycles of clock C1 to overlap with and erroneously select data bit transitions in data D2<0> and D2<1>. That is, the half-cycles are not centered in the data eyes of corresponding data bits to be selected by the half-cycles. As a result, erroneous/indeterminate successive bits B, A, C, B, D, and so on, are output in data D1 instead of the correct successive bits A, B, C, and D. The erroneous bits are indicted as a "bad_case" for serialized data D1 in FIG. 6.

Figure 7:
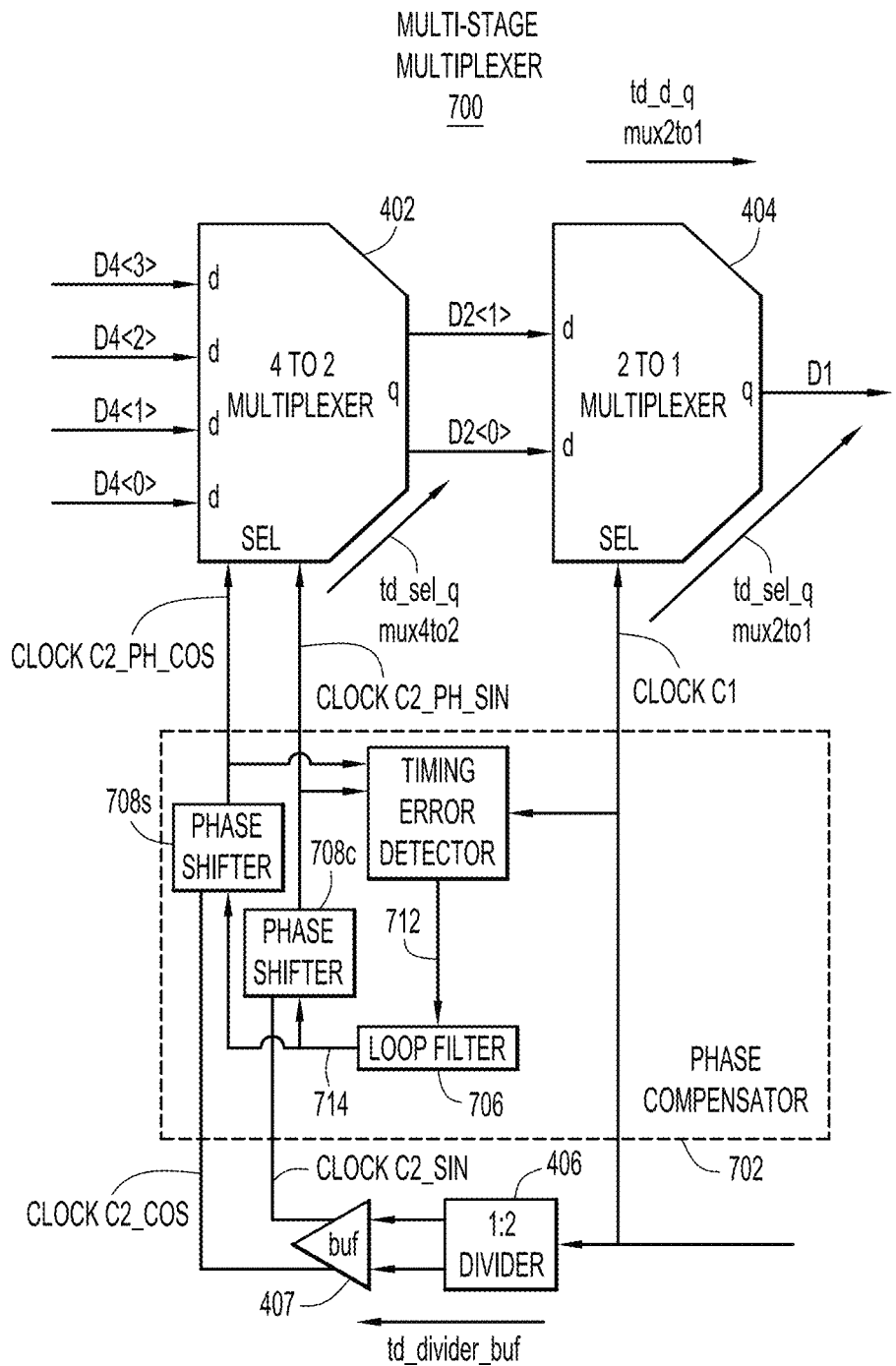
FIG. 7 is a block diagram of an example multi-stage multiplexer including a clock phase compensator configured to eliminate/compensate for an undesired phase-misalignment between a clock and input data that is selected by the clock.

Turning now to FIG. 7, there is shown a block diagram of an example multi-stage time division multiplexer 700 including a clock phase compensator 702 to compensate for phase-misalignment between clock C1 and data D2. Multi-stage multiplexer 700 includes all of the components of multi-stage multiplexer 400 in addition to clock phase compensator 702. Clock phase compensator 702 is a feedback circuit connected between upstream and downstream multiplexers 402 and 404 that compensates for the above-mentioned phase-misalignment, so that clock C1 is correctly time/phase aligned with data D2.

Clock phase compensator 702 includes a timing error detector (TED) 704, a loop filter 706, and phase shifters 708c and 708s. TED 704 receives as inputs high frequency clock C1 and phase-offset low frequency clocks C2_ph_cos and C2_ph_sin. Clocks C2_ph_cos and C2_ph_sin are phase-shifted versions of corresponding clocks C2_cos and C2-sin that are derived by clock phase compensator 702 (as described below) and used as clock selector inputs to upstream multiplexer 402. Based on clock C1 and clocks C2_ph_cos and C2_ph_sin, TED 704 derives an error signal 712 indicative of the phase-misalignment between clock C1 and serialized data D2. To do this, TED 704 includes multiplexer circuitry that is a replica of multiplexer circuitry in each of upstream and downstream multiplexers 402 and 404 and that processes clock C1 in combination with the clocks C2_ph_cos and C2_ph_sin so as to replicate, in error signal 712, the selector-path circuit delays in the upstream multiplexer and the selector-path and data-path circuit delays in the downstream multiplexer that contribute to the phase-misalignment.

TED 704 provides error signal 712 to loop filter 706. Loop filter 706 filters/smooths error signal 712 to produce a filtered error signal 714 (also referred to as a phase control signal 714), and provides the phase control signal to phase adjusters 708c and 708s.

Phase adjusters 708c and 708s adjust respective phases of clocks C2_cos and C2_sin relative to clock C1 to produce respective clocks C2_ph_cos and C2_ph_sin based on phase control signal 714, so as to reduce the phase-misalignment. Since error signal 714 is derived from error signal 712, it is understood that phase adjusters 708c and 708s adjust respective phases of clocks C2_cos and C2_sin based on error signal 712. In an example where frequencies/bitrates C1/D1 are in the multi-gigahertz/multi-gigabit range, phase adjustments to clocks C2_cos and C2_sin correspond to time adjustments in the picosecond range.

Figure 8:
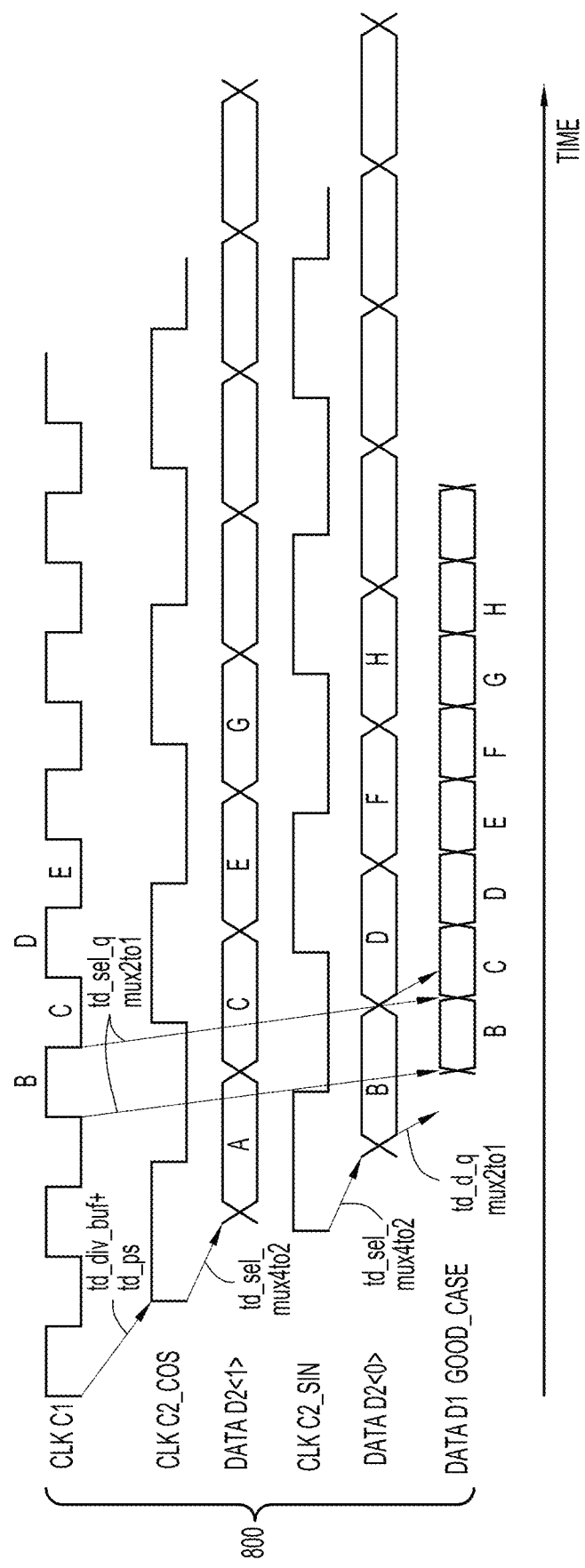
FIG. 8 is a timing diagram that shows an example timing relationship between various clock and data signals in the multi-stage multiplexer of FIG. 7, in which the undesired phase-misalignment has been removed by the clock phase compensator.

With reference to FIG. 8, there is depicted a timing diagram that shows an example ideal timing relationship 800 between various clock and data signals in multi-stage multiplexer 700, and in which the undesired phase-misalignment between clock C1 and data D2 has been removed (i.e., compensated for) by operation of clock phase compensator 702. A circuit delay td_ps introduced by phase shifters 708c and 708s is also depicted in FIG. 6 in addition to the other circuit delays described above in connection with FIGS. 4 and 7 that contribute to the phase-misalignment that is removed in the ideal timing arrangement of FIG. 8.

In the example of FIG. 8, clock half-cycles B, C, D, and E of clock C1 are correctly time/phase-aligned (e.g., centered) with data eyes of data bits in data D2<0> and D2<1>. Thus, clock half-cycles B, C, D, and E alternately select correct corresponding data bits B, C, D, and E and successively output the selected data bits as serial bits B, C, D, and E in serialized data D1. Clock phase compensator 702 compensates for the phase-misalignment and as a result correct data bits are output in serialized data stream D1, as indicated as a "good case" in FIG. 8.

Figure 9:
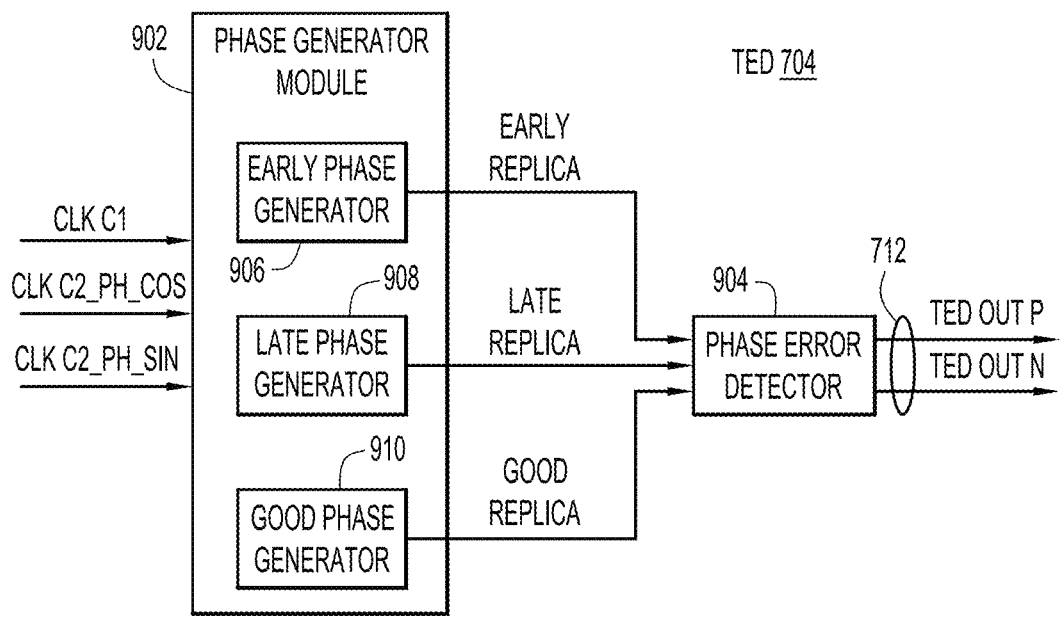
FIG. 9 is a block diagram of an example timing error detector (TED) of the clock phase compensator.

FIG. 9 is a block diagram of TED 704 according to an embodiment. TED 704 includes a phase generator module 902 and a phase error detector 904. Phase generator module 902 includes: (i) an early phase generator 906 to generate a time delayed replica of clock C2_ph_cos, referred to as an early replica; (ii) a late phase generator 908 to generate a time delayed replica of clock C2_ph_sin, referred to as late replica; and (iii) a good phase generator 910 to generate a time delayed, frequency divided replica of clock C1, referred to as a good replica.

Figure 10:
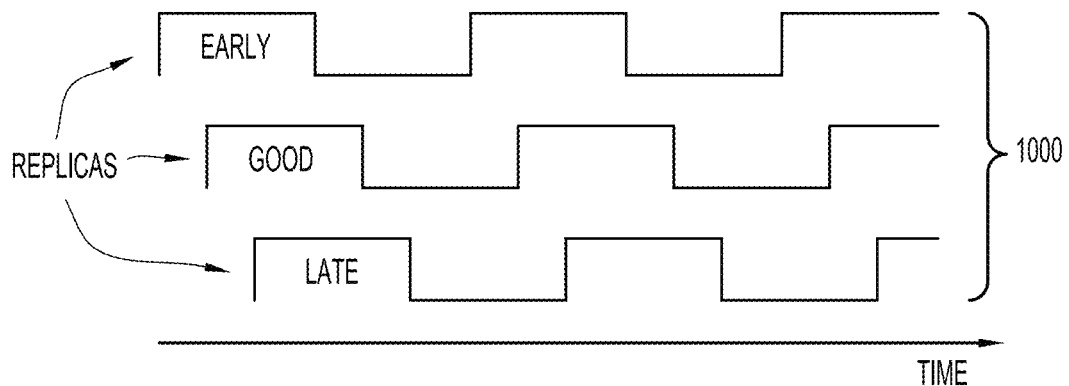
FIG. 10 is a timing diagram that shows an example timing relationship between early, late, and good replica signals generated by a phase generator module of the TED.

Turning to FIG. 10 there is a timing diagram that shows an example timing relationship 1000 between the early, late, and good replicas generated by phase generator module 902. In the ideal timing relationship, the good replica is time-centered between the early and late replicas. In the non-ideal timing relationship, the good replica is not time-centered between the early and late replicas.

Returning to FIG. 9, phase generator module 902 provides the early, late, and good replicas to phase error detector 904. Phase error detector 904 detects an early phase difference between the good replica and the early replica and a late phase difference between the good replica and the late replica, and generates error signal 712 based on the early and late phase differences. Clock phase compensator 702 operates to reduce the phase-misalignment to substantially zero in a steady state condition. When the phase-misalignment is substantially zero, the good replica is centered between the early and late replicas, and error signal 712 is also substantially zero. A differential embodiment of phase error detector 904 generates error signal 712 as a differential signal including a positive component TED Output P and a negative or complementary component TED Output N, as depicted in FIG. 9.

Figures 11, 12, 13:
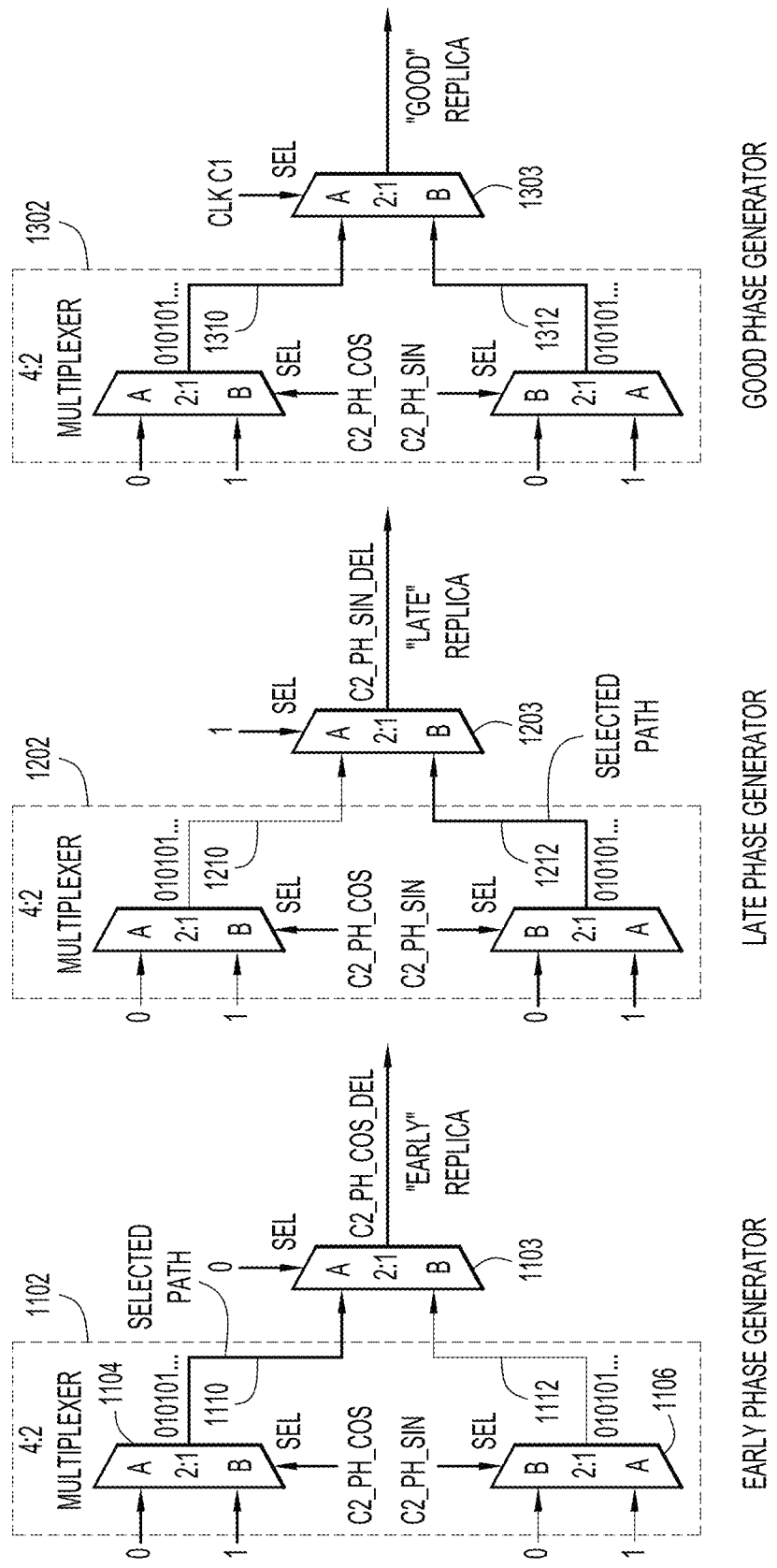
FIGS. 11, 12, and 13 are circuit diagrams of example early, late, and good phase generators, respectively, of the phase generator module.

FIGS. 11, 12, and 13 are circuit diagrams of early, late, and good phase generators 906, 908, and 910, respectively, according to an embodiment. To replicate in each of phase generators 906, 908, and 910 the various circuit delays that are introduced by multi-stage multiplexer 700, each of the phase generators includes multiplexer circuitry that is a replica of the circuitry in 4:2 multiplexer 402 (as depicted in FIG. 5) and a replica of the circuitry in 2:1 multiplexer 404, as described below.

With reference to FIG. 11, early phase generator 906 includes a 4:2 multiplexer 1102 that is a replica of 4:2 multiplexer 402 (as depicted in FIG. 5) and a 2:1 multiplexer 1103 that is a replica of 2:1 multiplexer 404. Multiplexer 1102 includes first and second parallel multiplexers 1104 and 1106 that are replicas of parallel multiplexers 504 and 506 in multiplexer 402. Multiplexers 1104 and 1106 each have first and second inputs fixed at logic 0 and logic 1 levels, respectively, and a selector input driven by a respective one of clocks C2_ph_cos and C2_ph_sin. As a result, multiplexers 1104 and 1106 generate outputs 1110 and 1112 as a series of alternately selected logic 1s and 0s and that are time delayed replicas of clocks C2_ph_cos and C2_ph_sin, respectively. Time delayed clock replicas 1110 and 1112 are also referred to as clocks C2_ph_cos_del and C2_ph_sin_del, respectively.

2:1 Multiplexer 1103 receives time delayed clock replicas 1110 and 1112 as respective data inputs and a logic 0 as a selector input. As a result, multiplexer 1103 selects and outputs timed delayed replica 1110 (C2_ph_cos_del) as the early replica. The early replica replicates an accumulation of circuit delays td_divider_buf, td_ps, td_sel_q (mux4to2), and td_d_q (mux2to1).

With reference to FIG. 12, late phase generator 908 includes a 4:2 multiplexer 1202 and a 2:1 multiplexer 1203 configured and operated in substantially the same way as 4:2 multiplexer 1102 and 2:1 multiplexer 1103 of early phase generator 906, respectively. Therefore, the description of early phase generator 906 shall suffice as a description for late phase generator 908, with the exception that in late phase generator 908 a selector input of multiplexer 1203 is drive by a logic 1 (instead of a logic 0 as in FIG. 11) to cause multiplexer 1203 to select and output delayed clock replica 1212 (clock C2_ph_sin_del) as the late replica. The late replica replicates an accumulation of circuit delays td_divider_buf, td_ps, td_sel_q (mux4to2), and td_d_q (mux2to1).

With reference to FIG. 13, good phase generator 910 includes a 4:2 multiplexer 1302 and a 2:1 multiplexer 1303 configured and operated in substantially the same way as 4:2 multiplexer 1102 and 2:1 multiplexer 1103 of early phase generator 906, respectively. Therefore, the description of early phase generator 906 shall suffice as a description for good phase generator 910, with the exception that in good phase generator 910 a selector input of 2:1 multiplexer 1303 is drive by clock C1 (instead of a steady state logic 1 or logic 0) to cause multiplexer 1303 to alternately select data bits from delayed replica 1310 and 1312 at a bit rate of C1/2 and output the selected bits successively as the good replica. The good replica replicates circuit delay td_sel_q (mux2to1).

Figure 14:
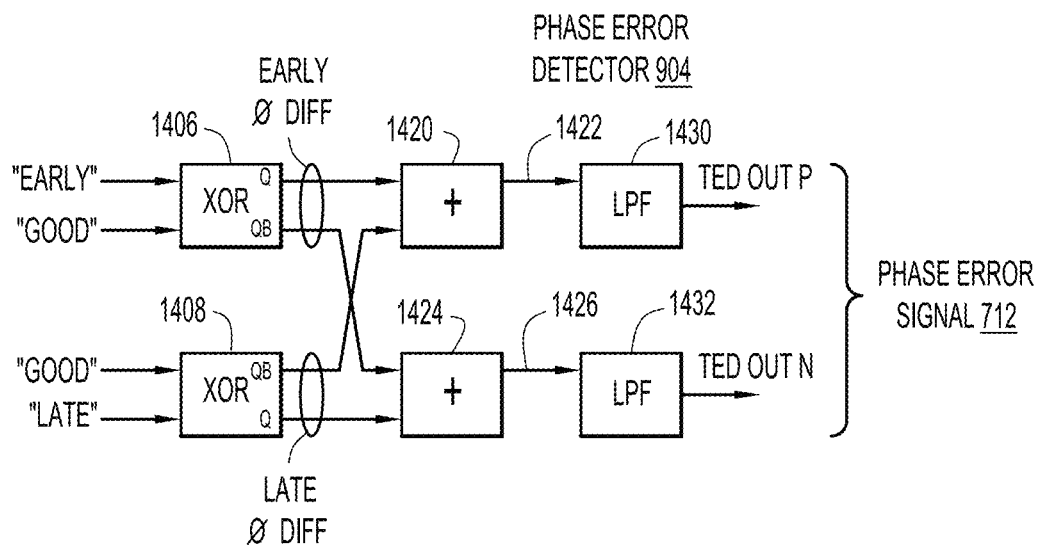
FIG. 14 is a block diagram of a phase error detector of the TED according to a first embodiment.

With reference to FIG. 14, there is a block diagram of phase error detector 904 according to a first embodiment. Phase error detector 904 includes a first XOR circuit 1406 to detect the early phase difference between the early and good replicas, and output the detected early phase difference as a differential signal from complimentary outputs Q and QB (i.e., inverted Q) of the XOR circuit. Phase error detector 1408 includes a second XOR circuit 1408 to detect the late phase difference between the late and good replicas, and output the detected late phase difference as a differential signal from complimentary outputs Q and QB of the XOR circuit.

Phase error detector 904 includes a first summer 1420 to sum together the detected early phase difference from the Q output of first XOR circuit 1406 and the detected late phase difference from the QB output of second XOR circuit 1408, to produce a positive-side differential signal 1422 representative of phase error signal 1704.

Phase error detector 904 includes a second summer 1424 to sum together the detected early phase difference from the QB output of first XOR circuit 1406 and the detected late phase difference from the Q output of second XOR circuit 1408, to produce a negative-side differential signal 1426 representative of phase error signal 1704.

Phase error detector 904 includes a first low pass filter (LPF) (also referred to as a clean-up filter) 1430 to filter signal 1422 to produce positive differential phase error signal TED OUT P of error signal 712 and a second clean-up filter 1432 to filter signal 1426 to produce negative differential error signal TED OUT N of the error signal.

Figure 15:
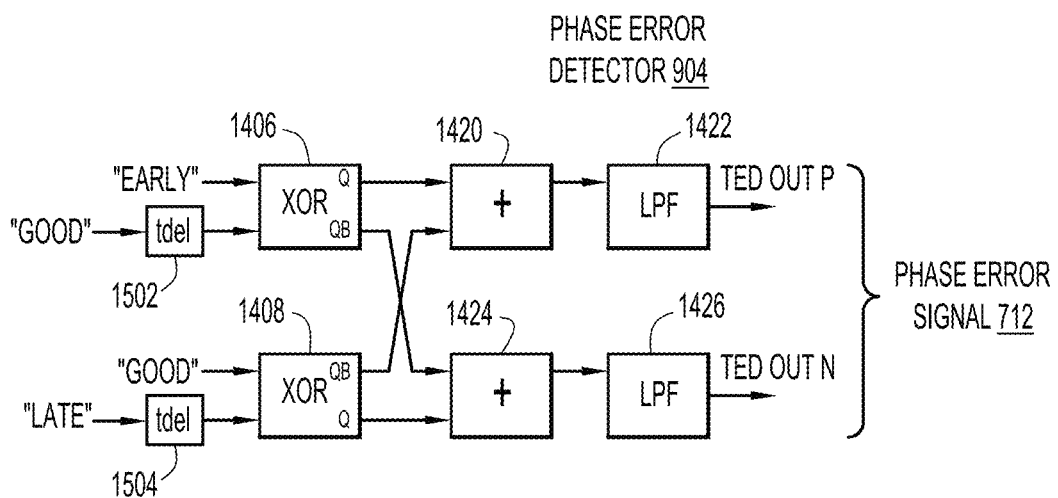
FIG. 15 is a block diagram of the phase error detector according to a second embodiment.

In practice, the XOR circuits/gates in FIG. 14 have a limited edge speed for internal and external signals. Therefore, an ideally triangular transfer function from phase to output low pass filter is distorted, and best sensitivity is achieved when the two XOR inputs of a given XOR circuit are driven to a near 90° phase difference. This can be achieved by introducing an additional delay into one of the XOR inputs relative to the other of the inputs, as depicted in the embodiment of FIG. 15. This additional delay is not critical to the overall TED functionality/function at optimum (i.e., ideal) timing, but it improves the XOR output signals, especially at high speeds.

With reference to FIG. 15, there is a block diagram of phase error detector 904 according to a second embodiment, which includes the above-mentioned additional delay. The first and second embodiments of phase error detector 904 are the same, except that in the second embodiment, the phase error detector includes (i) a first time delay circuit 1502 to delay the good replica relative to the early replica by a time tdel before the two replicas are input to first XOR circuit 1406, and (ii) a second time delay circuit 1504 to delay the late replica relative to the good replica by the time tdel before the two replicas are input to second XOR circuit 1408.

Figure 16:
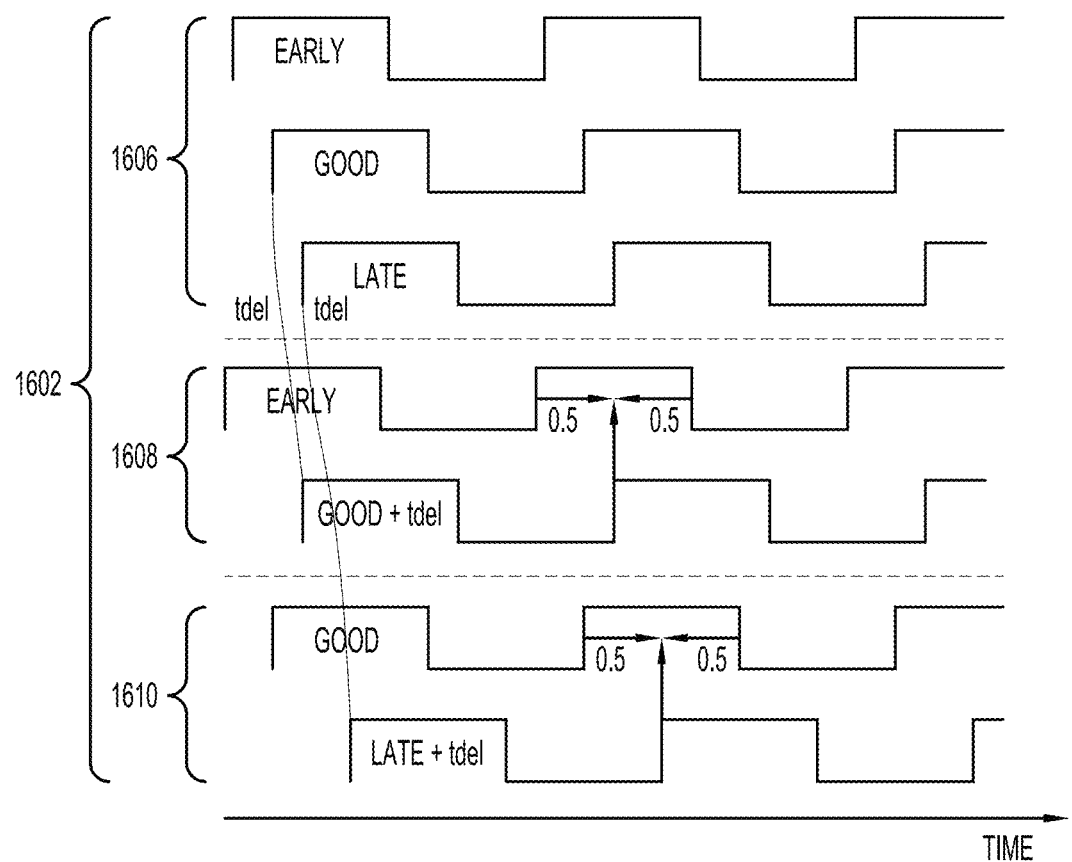
FIG. 16 is a timing diagram that shows various timing relationships between signals related to the phase error detector according to the second embodiment.

With reference to FIG. 16, there is a timing diagram 1602 that shows the following example timing relationships. A first timing relationship 1606 is shown between the early, good, and late replicas that are output by phase generator module 902. A second timing relationship 1608 is shown between the early replica and a version of the good replica that is delayed by time tdel in timing circuit 1502 that are input to first XOR circuit 1406 in the second embodiment of phase detector 904. A third timing relationship 1610 is shown between the good replica and a version of the late replica that is delayed by time tdel in delay circuit 1504 that are input to second XOR circuit 1408 in the second embodiment of phase detector 904.

Figure 17:
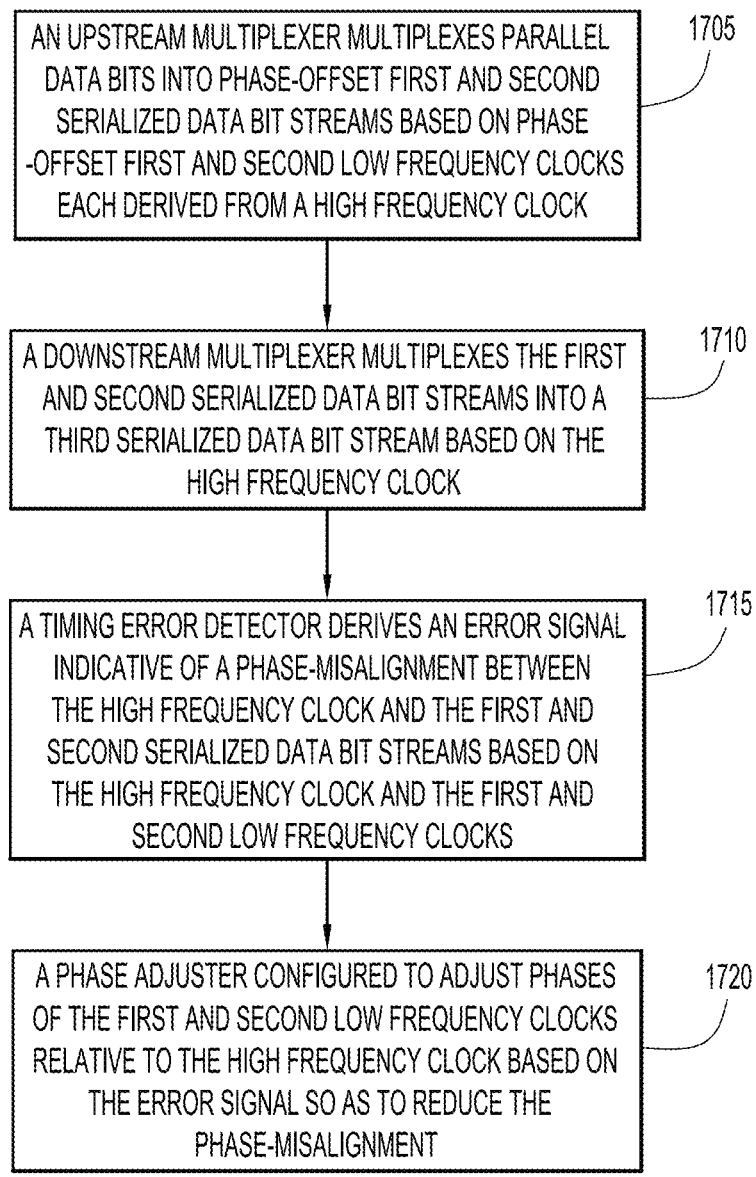
FIG. 17 is a flowchart of an example high-level method performed by the multi-stage time division multiplexer of FIG. 7.

With reference to FIG. 17, there is shown a flowchart of an example high-level method 1700 performed by multi-stage multiplexer 700. FIG. 17 is described also with reference to FIG. 7.

At 1705, upstream/first multiplexer 402 multiplexes data bits D4 presented at parallel data inputs of the multiplexer into phase-offset first and second serialized data bit streams D2 based on phase-offset first and second low frequency clocks C2_ph_cos and C2_ph_sin each derived from high frequency clock C1.

At 1710, downstream/second multiplexer 404 multiplexes first and second serialized data bit streams D2 into third serialized data bit stream D1 based on clock C2.

At 1715, TED 704 derives error signal 712 indicative of a phase-misalignment between the clock C2 and first and second serialized data bit streams D2 based on clock C2 and first and second clocks C2_ph_cos and C2_ph_sin.

At 1720, phase adjusters 708c and 708s respectively adjust phases of the first and second clocks C2_ph_cos and C2_ph_sin relative to the clock C2 based on error signal 712 so as to reduce the phase-misalignment.

In summary, in one form, a method is provided, comprising: upstream multiplexing data bits into first and second serialized data bit streams based on phase-offset first and second low frequency clocks each derived from a high frequency clock; downstream multiplexing the first and second serialized data bit streams into a third serialized data bit stream based on the high frequency clock; deriving an error signal indicative of a phase-misalignment between the high frequency clock and the first and second serialized data bit streams based on the high frequency clock and the first and second low frequency clocks; and adjusting phases of the first and second low frequency clocks relative to the high frequency clock based on the error signal so as to reduce the phase-misalignment.

In another form, an apparatus is provided, including: a first multiplexer configured to multiplex data bits into first and second serialized data bit streams based on phase-offset first and second low frequency clocks each derived from a high frequency clock; a second multiplexer configured to multiplex the first and second serialized data bit streams into a third serialized data bit stream based on the high frequency clock; a timing error detector configured to derive an error signal indicative of a phase-misalignment between the high frequency clock and the first and second serialized data bit streams based on the high frequency clock and the first and second low frequency clocks; and a phase adjuster configured to adjust phases of the first and second low frequency clocks relative to the high frequency clock based on the error signal so as to reduce the phase-misalignment.

In still another form, an apparatus is provided, including: first and second multiplexers each configured to multiplex respective subsets of data bits into respective ones of first and second serialized data bit streams based on respective ones of phase-offset first and second low frequency clocks; and a third multiplexer configured to multiplex the first and second serialized data bit streams into a third serialized data bit stream based on the high frequency clock; and a clock phase compensator, coupled to the first, second, and third multiplexers, configured to: process the high frequency clock in combination with the first and second low frequency clocks in order to replicate in an error signal selector-path circuit delays in the first and second multiplexers and selector-path and data-path circuit delays in the third multiplexer that collectively contribute to a phase-misalignment between the high frequency clock and the first and second serialized data bit streams; and adjust phases of the first and second low frequency clocks relative to the high frequency clock based on the error signal so as to reduce the phase-misalignment.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. An apparatus comprising:
a first multiplexer configured to multiplex data bits into first and second serialized data bit streams based on phase-offset first and second low frequency clocks each derived from a high frequency clock;
a second multiplexer configured to multiplex the first and second serialized data bit streams into a third serialized data bit stream based on the high frequency clock;
a timing error detector configured to derive an error signal indicative of a phase-misalignment between the high frequency clock and the first and second serialized data bit streams based on the high frequency clock and the first and second low frequency clocks; and
a phase adjuster configured to adjust phases of the first and second low frequency clocks relative to the high frequency clock based on the error signal so as to reduce the phase-misalignment.

2. The apparatus of claim 1, wherein the timing error detector includes multiplexer circuitry that is a replica of multiplexer circuitry in each of the first and second multiplexers and that is configured to process the high frequency clock in combination with the first and second low frequency clocks in order to replicate, in the error signal, selector-path circuit delays in the first multiplexer and selector-path and data-path circuit delays in the second multiplexer that contribute to the phase-misalignment.

3. The apparatus of claim 1, wherein:
the first multiplexer is configured to alternately select data bits from the first and second serialized data bit streams based on successive half-cycles of the high frequency clock and output the alternately selected data bits as successive data bits in the third serialized data bit stream; and
the phase adjuster is configured to adjust the phases of the first and second low frequency clocks relative to the high frequency clock in response to the error signal so that the half-wave cycles of the high frequency clock are centered within data eyes of corresponding ones of the alternately selected data bits.

4. The apparatus of claim 1, wherein the timing error detector further includes:
a phase generator configured to generate a delayed early replica of the first low frequency clock, a delayed late replica of the second low frequency clock, and a delayed, frequency divided replica of the high frequency clock as a delayed good replica; and a phase error detector configured to detect phase differences between the good replica and each of the early and late replicas and generate the error signal based on the detected phase differences.

5. The apparatus of claim 4, wherein the phase error detector includes:
a first XOR circuit configured to output differential first and second indicators of the phase difference between the good and early replicas;
a second XOR circuit configured to output differential third and fourth indicators of the phase difference between the late and good replicas;
a first summer configured to sum the first and fourth indicators to produce a first sum output;
a second summer configured to sum the second and third indicators to produce a second sum output, wherein the first and second sum outputs are differential outputs; and
first and second filters configured to filter the first and second sum outputs respectively to produce the error signal as a differential error signal.

6. The apparatus of claim 4, wherein the phase generator includes:
a first phase generator configured to generate the delayed early replica;
a second phase generator configured to generate the delayed late replica; and
a third phase generator configured to generate the good replica.

7. The apparatus of claim 4, wherein the phase generator includes multiplexer circuitry that is a replica of multiplexer circuitry in each of the first and second multiplexers so as to replicate selector-path circuit delays in the first multiplexer and selector-path and data-path circuit delays in the second multiplexer that all contribute to the phase-misalignment.

8. The apparatus of claim 1, further comprising a loop filter configured to filter the error signal and produce a filtered error signal, wherein the phase adjuster includes first and second phase adjusters configured to adjust phases of the first and second clocks by a same amount based on the filtered error signal.

9. The apparatus of claim 1, further comprising a frequency divider to frequency divide the high frequency clock to produce the first and second low frequency clocks at a same frequency.

10. The apparatus of claim 1, wherein the first multiplexer includes parallel first and second multiplexers to multiplex respective subsets of the data bits into respective ones of the first and second serialized data bits based on respective ones of the first and second low frequency clocks.

11. A method comprising:
upstream multiplexing data bits into first and second serialized data bit streams based on phase-offset first and second low frequency clocks each derived from a high frequency clock;
downstream multiplexing the first and second serialized data bit streams into a third serialized data bit stream based on the high frequency clock;
deriving an error signal indicative of a phase-misalignment between the high frequency clock and the first and second serialized data bit streams based on the high frequency clock and the first and second low frequency clocks; and
adjusting phases of the first and second low frequency clocks relative to the high frequency clock based on the error signal so as to reduce the phase-misalignment.

12. The method of claim 11, wherein the deriving an error signal includes processing the high frequency clock in combination with the first and second low frequency clocks in order to replicate in the error signal selector-path circuit delays that occur in the upstream multiplexing and selector-path and data-path circuit delays that occur in the downstream multiplexing that contribute to the phase-misalignment.

13. The method of claim 11, wherein:
the downstream multiplexing includes alternately selecting data bits from the first and second serialized data bit streams based on successive half-cycles of the high frequency clock and output the alternately selected data bits as successive data bits in the third serialized data bit stream; and
the adjusting the phases includes adjusting the phases of the first and second low frequency clocks relative to the high frequency clock in response to the error signal so that the half-wave cycles of the high frequency clock are centered within data eyes of corresponding ones of the alternately selected data bits.

14. The method of claim 11, wherein the deriving an error signal includes:
generating a delayed early replica of the first low frequency clock, a delayed late replica of the second low frequency clock, and a delayed, frequency divided replica of the high frequency clock as a delayed good replica; and
detecting phase differences between the good replica and each of the early and late replicas and generating the error signal based on the detected phase differences.

15. The method of claim 14, wherein the deriving an error signal further includes replicating in the error signal selector-path circuit delays introduced by the upstream multiplexing and data-path circuit delays introduced by the upstream multiplexing that all contribute to the phase-misalignment.

16. The method of claim 11, further comprising filtering the error signal to produce a filtered error signal, wherein the adjusting phases includes adjusting phases of the first and second clocks by a same amount based on the filtered error signal.

17. The method of claim 11, further comprising frequency dividing the high frequency clock to produce the first and second low frequency clocks at a same frequency.

18. The method of claim 11, wherein the upstream multiplexing includes multiplexing respective subsets of the data bits into respective ones of the first and second serialized data bits based on respective ones of the first and second low frequency clocks.

19. An apparatus comprising:
first and second multiplexers each configured to multiplex respective subsets of data bits into respective ones of first and second serialized data bit streams based on respective ones of phase-offset first and second low frequency clocks; and
a third multiplexer configured to multiplex the first and second serialized data bit streams into a third serialized data bit stream based on the high frequency clock; and
a clock phase compensator, coupled to the first, second, and third multiplexers, configured to:
process the high frequency clock in combination with the first and second low frequency clocks in order to replicate in an error signal selector-path circuit delays in the first and second multiplexers and selector-path and data-path circuit delays in the third multiplexer that collectively contribute to a phase-misalignment between the high frequency clock and the first and second serialized data bit streams; and adjust phases of the first and second low frequency clocks relative to the high frequency clock based on the error signal so as to reduce the phase-misalignment.

20. The apparatus of claim 19, wherein the clock phase compensator includes:
- a first phase generator, including multiplexer circuitry that is a replica of multiplexer circuitry in the first multiplexer, configured to produce a delayed early replica of the first low frequency clock;
- a second phase generator, including multiplexer circuitry that is a replica of multiplexer circuitry in the second multiplexer, configured to produces a delayed late replica of the second low frequency clock;
- a third phase generator, including multiplexer circuitry that is a replica of multiplexer circuitry in the third multiplexer, configured to produces a delayed, frequency-divided replica of the high frequency clock as a good replica; and
- a phase detector to detect phase differences between the good replica and each of the early and late replicas and generate the error signal based on the detected phase differences.

\* \* \* \* \*

UNITED STATES PATENT AND TRADEMARK OFFICE
CERTIFICATE OF CORRECTION

PATENT NO. : 9,246,616 B2
APPLICATION NO. : 14/174087
DATED : January 26, 2016
INVENTOR(S) : Hauenschild et al.

It is certified that error appears in the above-identified patent and that said Letters Patent is hereby corrected as shown below:

On the Title page

Item (73) Assignee:, replace "Cisco Technologies, Inc." with -- Cisco Technology, Inc. --.

Signed and Sealed this
Tenth Day of May, 2016

Michelle K. Lee
*Director of the United States Patent and Trademark Office*